W. E. KELLY.
CUTTER HOLDING MEANS FOR BORING BARS.
APPLICATION FILED JULY 21, 1920.

1,435,709.

Patented Nov. 14, 1922.

INVENTOR
William E. Kelly
BY
ATTORNEY

Patented Nov. 14, 1922.

1,435,709

UNITED STATES PATENT OFFICE.

WILLIAM E. KELLY, OF CLEVELAND, OHIO.

CUTTER-HOLDING MEANS FOR BORING BARS.

Application filed July 21, 1920. Serial No. 397,994.

*To all whom it may concern:*

Be it known that I, WILLIAM E. KELLY, a citizen of the United States, residing in Cleveland, county of Cuyahoga, and State of Ohio, have invented a new and useful Improvement in Cutter-Holding Means for Boring Bars, of which the following is a specification.

My invention relates to apparatus which have cutters and particularly where such cutters must be removable from and returnable to their exact original position and held there either rigidly or floatingly within certain limits.

The object of my invention is an efficient, practical, and economical means of locating and locking a cutter in an apparatus.

Figure 1:
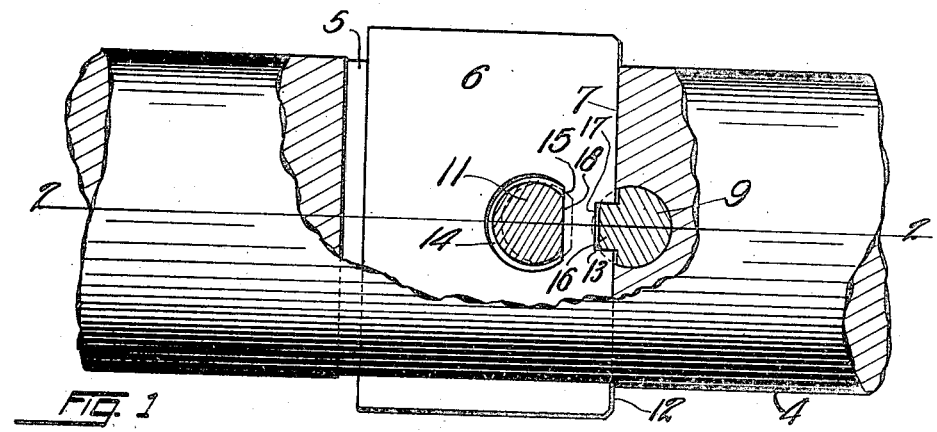
Figure 2:
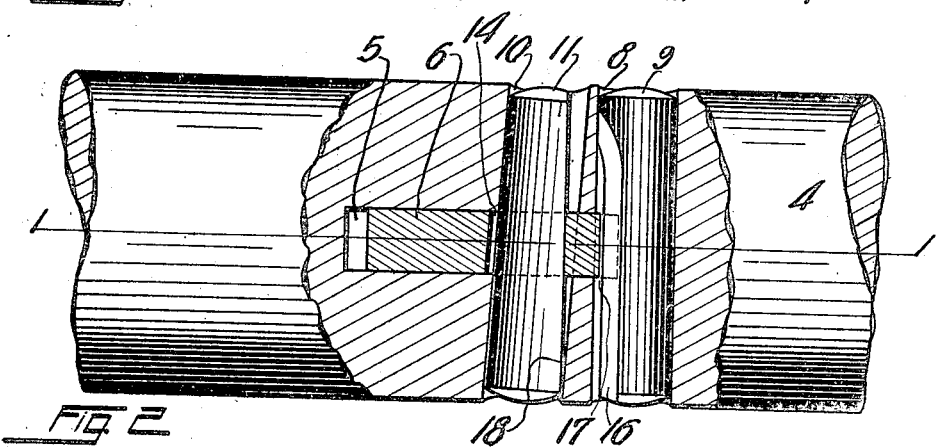
Figure 3:
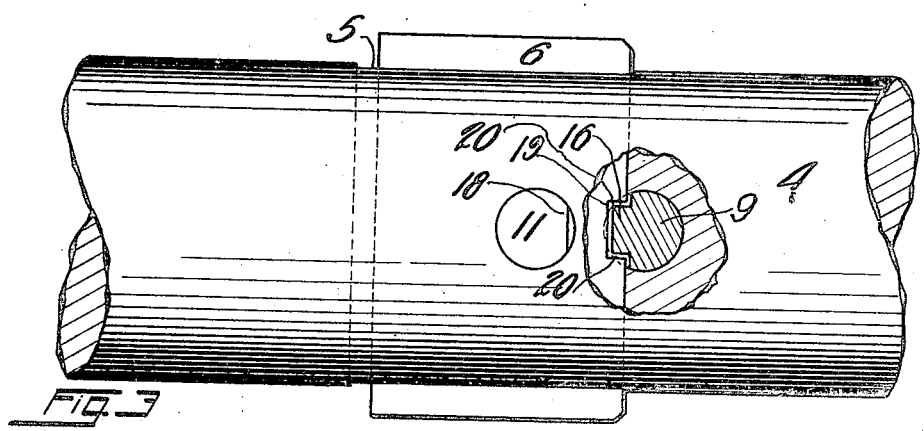

I attain this object by the mechanism shown in one embodiment in the accompanying drawing in which Fig. 1 is a side view of a reamer partly broken away to line 1—1 of Fig. 2 to show the cross sectional form of the pins; Fig. 2 is a plan view partly broken away to line 2—2 of Fig. 1 to show the relations of the pins with the body and the cutter; and Fig. 3 is a side view partly broken away to show arrangement when the cutter is to be held floatingly.

Similar reference numerals refer to similar parts throughout the views.

In many apparatus having cutters, reamers for instance, considerable disadvantage is found in the method and mechanism of not only holding the cutter in place but also in removing the same from the body and replace the same again in its exact original position, as in grinding the cutter for instance. The means and mechanisms heretofore employed do not meet the above conditions satisfactorily and considerable time and expense is wasted in the use of such apparatus as heretofore devised. The present invention provides an efficient, practical, and economical means for overcoming the above disadvantages.

Referring now particularly to the drawing which shows the present invention embodied in a boring bar cutter in which art the present invention is very advantageous.

The body 4, made of suitable material, has the slot 5 into which the cutter 6 fits sidewise, preferably a stiff sliding fit, but which slot is longer than the width of the cutter 6, the purpose whereof will appear hereinafter. Adjacent the slot 5 and transversely thereof and a suitable distance from the front wall 7 of the slot 5, the body 4 has the opening 8 into which the locating pin 9 fits snugly, and the opening 10 into which the lock pin 11 fits snugly. Both openings, 8 and 10 are cylindrical and the opening 10 is inclined to the opening 8 and to the transverse axis of the body 4. Otherwise the body 4 may be formed to suit any particular or general purpose or condition.

The cutter 6, made of suitable material, and size, has the front face 12 into which the notch 13 is cut and further has the opening 14 which has the flat wall 15 parallel with the face 12. Otherwise the cutter 6 may be formed or prepared to suit any particular or general purpose.

The locating pin 9, made of suitable material, fits snugly into the opening 8 and has two longitudinal kerfs cut therein, preferably part way only as shown, to form the key portion 16 which snugly fits the notch 13 sidewise but has clearance at 17.

The lock pin 11, made of suitable material, fits snugly into the opening 10 and has the flat surface 18 inclined to the longitudinal axis of the pin 11. This inclination should correspond to the inclination of the opening 10 to the end that the surface 18 has a good bearing on the wall 15 of the opening 14 in the cutter 6 when the pin 11 is in place. This lock pin 11, as shown in Fig. 2, has rounded ends and dependance is had on the frictional engagement between the wall of the opening 10 and the round surface of the pin 11 to hold the same in position. When a more positive lock is required, any of the well known mechanical means may be employed to hold the pin 11 in position longitudinally.

In Fig. 3, the cutter 6 has the notch 19 which is wider than the key 16 to provide end play at 20 to the end that the cutter 6 may float. The amount of such float being the difference of the width of the key 16 and the width of the notch 19.

After the several parts are made up as shown and described, the apparatus is assembled as follows:

First drive the locating pin 9 into place as shown; care being exercised to the end that the sides of the key 16 which engage the notch 13 are parallel with the longitudinal axis of the body 4. A means for locking the pin 9 in proper position, such as a screw or key for instance, may be advantageously installed. Then insert the cutter 6 into the slot in the body 4, then slide the cutter 6 forward longitudinally, with the notch 13 over the key 16, until the face 12 bears against the front wall of the slot 15; for this purpose the slot 15 is made longer than the width of the cutter 6 as hereinbefore referred to. Then insert the lock pin 11 and drive it sufficiently far to cause the face 12 of the cutter to rest against the front wall 7 of the slot and the face 18 against the wall 15 of the cutter. When all the parts are properly made, a three point suspension is accomplished in holding and locating the cutter and such holding and locating of the cutter takes place at the front and cutting end of the cutter which is a very desirable feature. When the parts are assembled as set forth the apparatus is ready for use with a rigidly held cutter. When it is desired to hold a cutter floatingly, it is preferred that the original body 4 and locating pin 9 be employed but the cutter then has a wider notch (19) as seen in Fig. 3. The cutter 6 may, however, retain its original notch (13) but the key 16 must then be reduced in width to permit the cutter to move lengthwise. It is preferred however that the body remain intact and that the notch be changed, particularly so since the key 16 must be located properly and centrally, and removing and inserting the pin 9 and properly locating the same requires considerable care and time unless some means, such as a key or screw, is provided to the end that the pin 9 is always inserted into the same position.

This invention, although shown and described as embodied in a boring bar, is applicable to other apparatus with suitable modification. Therefore, without limiting myself to the precise construction shown and described,

I claim:—

1. The combination of an apparatus having a cutter, with a locating pin mounted in the body of said apparatus and adapted to locate said cutter, and a lock pin mounted in said body and passing transversely through said cutter and adapted to engage said cutter near the operating end thereof to lock the same in position.

2. The combination of an apparatus having a cutter which has a notch, with a locating means mounted in the body of said apparatus and formed and located to engage said notch to locate said cutter, and a lock means mounted in said body and passing transversely through said cutter and adapted to engage said cutter near the operating end thereof to lock the same in position.

3. The combination of an apparatus having a cutter which has a lock opening with a substantially flat face near the operating end thereof, with a locating means mounted in the body of said apparatus and adapted to locate said cutter, and a lock means mounted in said body and passing transversely through said cutter and provided with a substantially flat face to engage said flat face in said opening to lock said cutter in position.

4. The combination of an apparatus having a cutter which has a notch and a lock opening with a substantially flat face near the operating end thereof, with a locating means mounted in the body of said apparatus and formed and located to engage said notch to locate said cutter, and a lock means inclinedly mounted in said body and passing transversely through said cutter and provided with a substantially flat surface to engage said flat face in said cutter opening to lock said insert in position.

5. In a cutting tool, the combination of a body, a cutter in said body, a locating pin mounted in said body and adapted to engage the front end of said cutter to locate the same, and a lock pin mounted in said body and passing transversely through said cutter and adapted to engage said cutter near the front end thereof to lock the same in position.

6. In a cutting tool, the combination of a body, a cutter in said body and provided with a notch in the front face thereof and with an opening near the front face thereof which opening has a substantially flat face, a locating pin mounted in said body and formed to engage said notch to locate said cutter, and a lock pin inclinedly mounted in said body and passing transversely through said cutter and provided with a substantially flat surface to engage said flat face in said opening to lock the same in position.

WM. E. KELLY.